United States Patent [19]

Tuusa

[11] Patent Number: 5,157,574
[45] Date of Patent: * Oct. 20, 1992

[54] OVERVOLTAGE PROTECTOR FOR RECTIFIER/INVERTER BRIDGES

[75] Inventor: Heikki Tuusa, Tatipere, Finland

[73] Assignee: Kone Elevator GmbH, Baar, Switzerland

[*] Notice: The portion of the term of this patent subsequent to Aug. 6, 2008 has been disclaimed.

[21] Appl. No.: 715,050

[22] Filed: Jun. 12, 1991

Related U.S. Application Data

[63] Continuation of Ser. No. 353,358, May 17, 1989, abandoned.

[30] Foreign Application Priority Data

May 17, 1988 [FI] Finland ................... 882309

[51] Int. Cl.[5] ................................................ H02H 9/04
[52] U.S. Cl. ........................................ 361/56; 361/18; 361/86; 361/91; 363/55
[58] Field of Search .................... 361/18, 33, 56, 59, 361/86, 91, 111, 42, 75, 74; 363/52, 55, 58, 50

[56] References Cited

U.S. PATENT DOCUMENTS

| | | | |
|---|---|---|---|
| 3,887,862 | 6/1975 | Hubner | 363/50 |
| 4,331,994 | 5/1982 | Wirth | 361/56 |
| 4,437,133 | 3/1984 | Rueckert | 361/56 X |
| 4,721,897 | 1/1988 | Matsuse et al. | 363/58 X |
| 4,843,533 | 6/1989 | Roof et al. | 363/55 |
| 5,038,244 | 8/1991 | Tuusa | 361/56 |

FOREIGN PATENT DOCUMENTS

| | | |
|---|---|---|
| 1394242 | 5/1975 | United Kingdom . |
| 1441595 | 7/1976 | United Kingdom . |
| 2060298 | 4/1981 | United Kingdom . |

Primary Examiner—Todd E. Deboer
Attorney, Agent, or Firm—Sughrue, Mion, Zinn, Macpeak & Seas

[57] ABSTRACT

A device for overvoltage protection of rectifier/inverter bridges employing gate-controlled solid-state switches without zero diodes is disclosed. To protect at least the solid-state switches of the rectifier/inverter bridge against overvoltages, the device incorporates one or two overvoltage protector units which are activated when the voltage between at least two protection connections exceeds the voltage across a storage capacitor of the overvoltage protector unit. Thus, a controllable switch connected in parallel with the storage capacitors is turned on when the voltage between two protection connections exceeds an excitation value and is turned off when the voltage falls below the excitation value, controlled by a control unit of the protector unit.

16 Claims, 5 Drawing Sheets

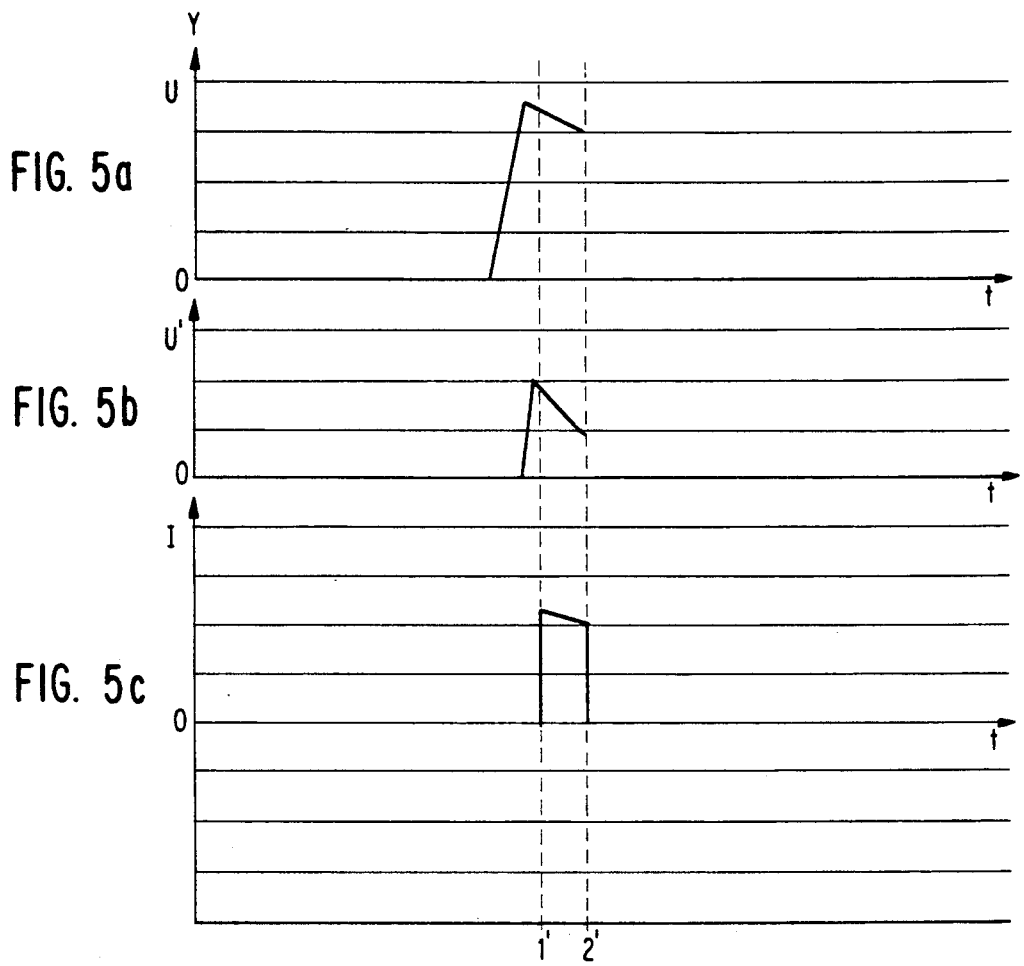
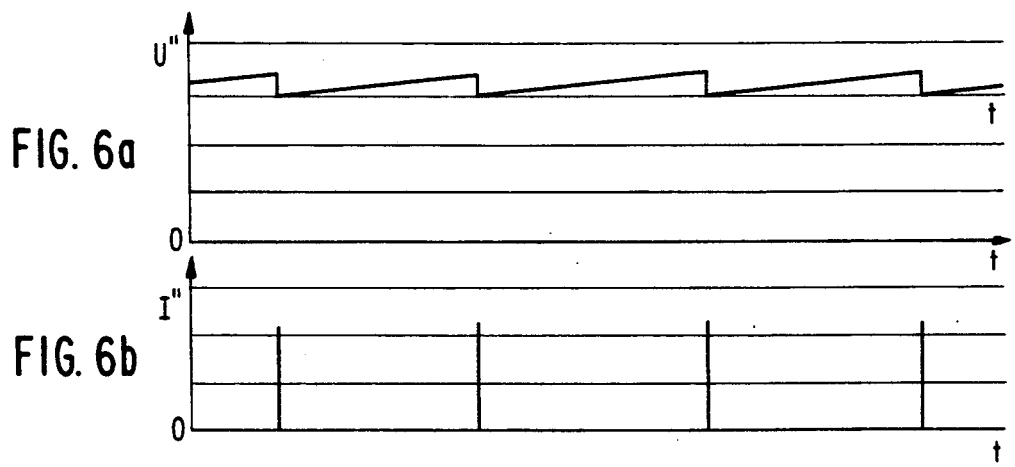

OVERVOLTAGE PROTECTOR FOR RECTIFIER/INVERTER BRIDGES

This is a continuation, of application Ser. 07/353,358, filed May. 17, 1989, now abandoned.

BACKGROUND OF THE INVENTION

The present invention relates to an overvoltage protector for rectifier/inverter bridges employing gatecontrolled solid-state switches without zero diodes.

SUMMARY OF THE INVENTION

An object of the invention is to achieve a centralized solution for overvoltage protection. To protect at least the solid-state switches of the rectifier/inverter bridge against overvoltages, the device incorporates at least one overvoltage protector unit which is activated when the voltage between at least two protection connections in the main circuit rises above the voltage across a storage capacitor of the protector unit A controllable switch is connected in parallel with the capacitor, the switch is turned on when voltage between the at least two protection connections exceeds an excitation value and is turned off when the voltage falls below the excitation value.

In a preferred embodiment, the overvoltage protector units comprises at least one diode bridge connected via protection connections to the a.c. mains, or to an a.c. load or to the solid-state switches' terminals-either those on the side of the mains or those on the side of the load. A pair of diodes connects each one of the protection connections of the main d.c. circuit to at least one of the poles of the d.c. circuit in said overvoltage protector, such that when the voltage between two or more of the protection connections exceeds the voltage across the storage capacitor, discharge current flows through the forward-connected diodes in the respective connection branches and through the storage capacitor or the controllable switch, controlled by a control unit.

In another preferred embodiment of the device of the invention, the control unit incorporates at least one resistor through which the required energy is supplied to the unit from said capacitor, and means for taking energy from the diode bridge of the control unit.

BRIEF DESCRIPTION OF THE DRAWINGS

Further objects, features and advantages of the invention will become apparent to those skilled in the art from the following description when taken in conjunction with the accompanying drawings, in which:

FIG. 5a illustrates a time diagram of the capacitor voltage, when power is connected to the mains bridge;

FIG. 5b illustrates a time diagram of the voltage of the differential amplifier, when power is connected to the mains bridge;

FIG. 5c illustrates a time diagram of the current through the transistor and resistor, when power is connected to the mains bridge;

FIG. 6a illustrates a time diagram of the capacitor voltage, and when the bridge is conducting; and FIG. 6b illustrates a time diagram of the current through the transistor and resistor, when the bridge is conducting.

DESCRIPTION OF THE PREFERRED EMBODIMENTS

In the present context, the designation "rectifier/inverter bridges employing gate-controlled solid-state switches without zero diodes" refers to bridges whose structure is such that no zero diodes can be connected in parallel with the controlled switching components (e.g. GTO thyristors and power transistors) or in which the action of parasitic zero diodes is prevented by means of other components connected in series with the switching components. Examples of such bridges are the two-quadrant or four-quadrant PWM rectifier bridge B3 shown in FIG. 3a, consisting of solid-state switches K1-K6, and the mains bridge B4 and motor bridge B5 in the frequency converters in FIGS. 3b and 3c. These converters are provided with intermediate circuits and consist of two bridges with two quadrants, each bridge having solid-state switches K1-K6 and K7-K12, each of these switches being connected in series with a diode D1'-D6' and D7'-D12'. The d.c. circuit comprises a filtering choke L or chokes L7 and L8. These converter circuits are used in elevator drives where the overvoltages appearing on the side of the motor (d.c. motor M or a.c. motor M') and on the side of the mains L1, L2, L3 have to be minimized. It is characteristic of such bridges that when the flow of the current in the d.c. circuit is interrupted e.g. as a result of an error in the control or as a results of the action of a protection means, because of the large inductance of the circuit an overvoltage transient is generated, against which the bridge components have to be protected. Due to the large inductances and large intermediate circuit currents, the protector has to be capable of absorbing fairly large amounts of energy, which is another reason why the number of protectors required should be minimized.

Figure 1A:
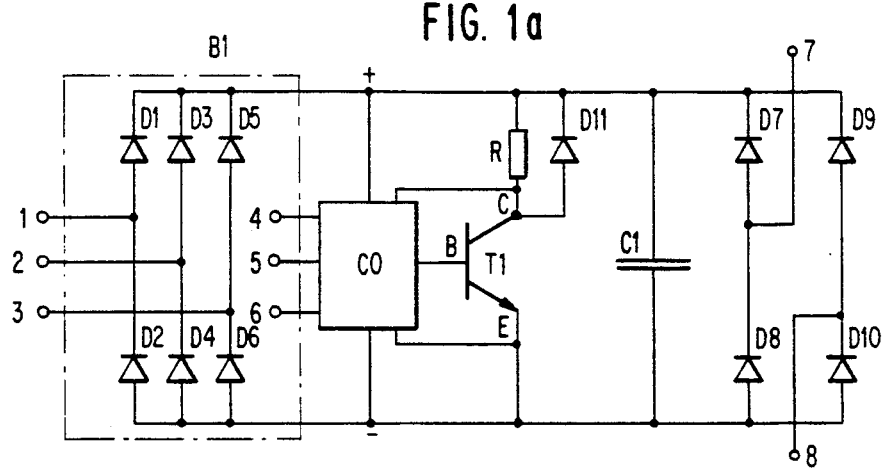
FIG. 1a is a circuit diagram of a centralized overvoltage protector.

FIG. 1a shows the basic structure of the centralized solution for overvoltage protection as provided by the invention. This circuit (referred further as S1) can be used in the rectifier bridge shown in FIG. 3a. The overvoltage protector of the frequency converter with an intermediate circuit as shown in FIG. 3b consists of two units S2/1 and S2/2, illustrated in FIG. 1b. If the inductance in the intermediate circuit of the frequency converter is divided into two equal parts as in FIG. 3c, where inductance L7 is connected to the positive pole and inductance L8 to the negative pole of the d.c. circuit, then a single overvoltage protector is shown in FIG. 1c is used.

Figure 2:
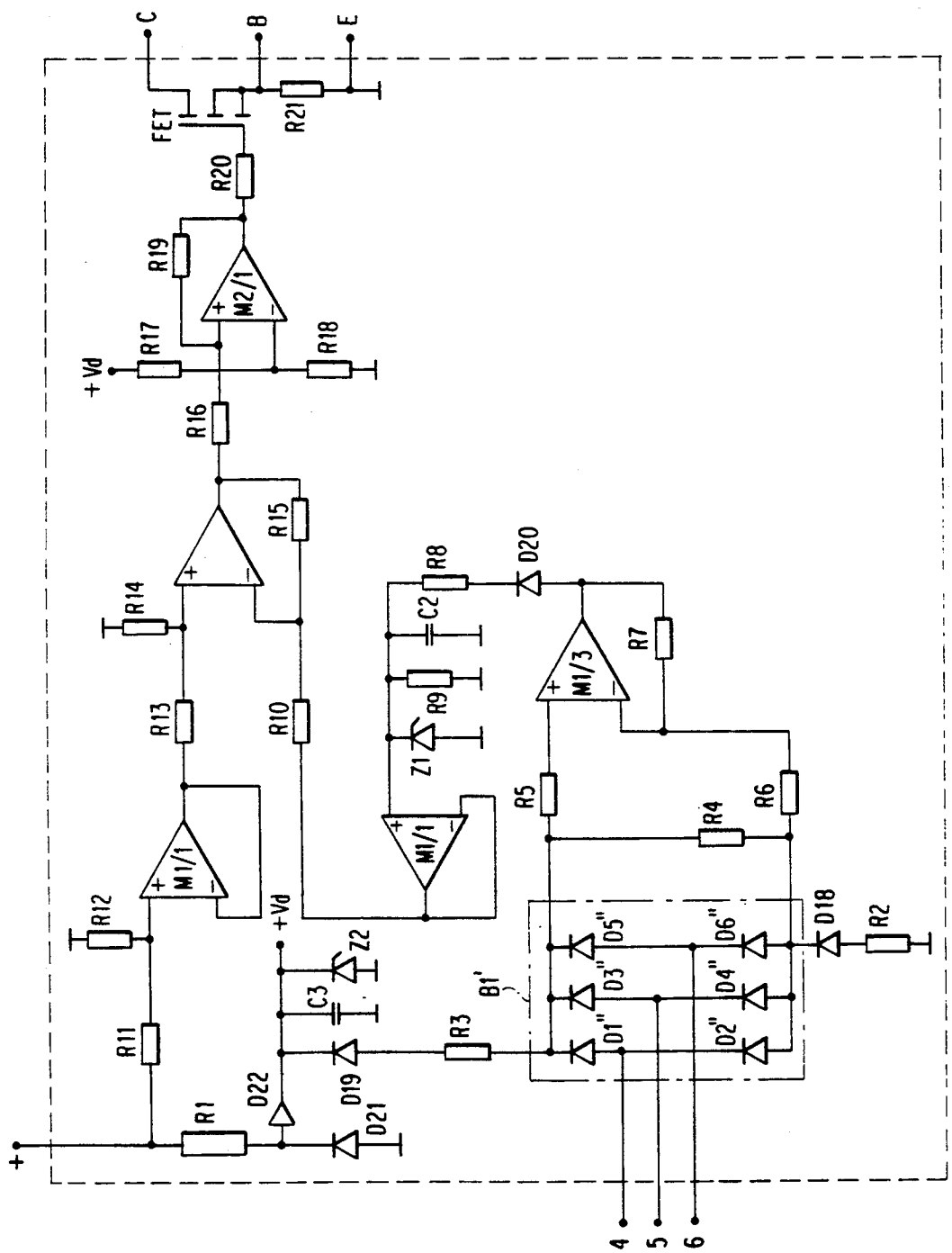
FIG. 2 is the circuit diagram of a control unit of the overvoltage protector.

The protectors are activated when the voltage between any two of the protection connections 1-3 or 7-13 rises above the voltage across the capacitor C1. A control unit CO and a transistor T1 are connected in parallel with the capacitor. Transistor T1 turns on when the protector voltage increases above the comparator M2/1 excitation value and turns off when the voltage falls below the turn-off value. The use of the hysteresis comparator M2/1, in the control unit is required since the excitation value is somewhat higher than the turn-off value, as is typical for this kind of two-state control. Because of the amplification, the turn-on voltage of the protector transistor T1 is always somewhat higher than the peak value of the main voltage of the mains supplies after motor or the motor. This is implemented using a control circuit as shown in FIG. 2, in which the peak value of the main voltage in the paints referred 4-6 is measured by means of a diode bridge B1'', which consists of diodes D1''-D6'', and a differential amplifier M1/3. Resistor R4 keeps the diode bridge continuously in the conducting state. Resistors R5 and R6 connect the bridge to the input terminals of the amplifier M1/3, R7 being a feedback resistor. The voltage is passed through diode D20 and resistor R8 to a parallel group consisting of capacitor C2, resistor R9 and Zener diode Z1, which limits the maximum value of this reference voltage to the value permitted by the bridge.

This reference voltage is then passed via a voltage follower M1/4 and a resistor R10 to another differential amplifier M1/2, which give the difference between the reference voltage and the voltage across the storage capacitor C1 as measured by amplifier M1/1 and resistors R11 and R12. Resistors R10 and R13-R15 are connected to the differential amplifier M1/2 to produce the difference. This difference is passed via resistor R16 to the comparator M2/1. The negative input of comparator M2/1 is fixed from the voltage +Vd by means of resistors R17 and R18. Feedback occurs via resistor R19. When the difference increases beyond the excitation value, the comparator is activated and, via R20, turns on the FET controlling the protector transistor T1, which therefore also turns on. The collector C, base B and emitter E of transistor T1 are shown in FIG. 2. Between the base and the emitter is a resistor R21. The energy of capacitor C1 is now discharged into the power resistor R, connected in parallel with a diode D11, until the state of the hysteresis comparator M2/1 changes.

The energy required by the control circuit of the overvoltage protector is taken either from the protector circuit capacitor C1 via pull-up resistor R1 and diode D22, or from the mains via diode bridge B1'' by means of resistors R2 and R3 and diodes D18 and D19. Diode D21 protects the control electronics. The supply voltage +Vd is obtained from the terminals of capacitor C3, this voltage being stabilized by Zener diode Z2.

Figure 3A:
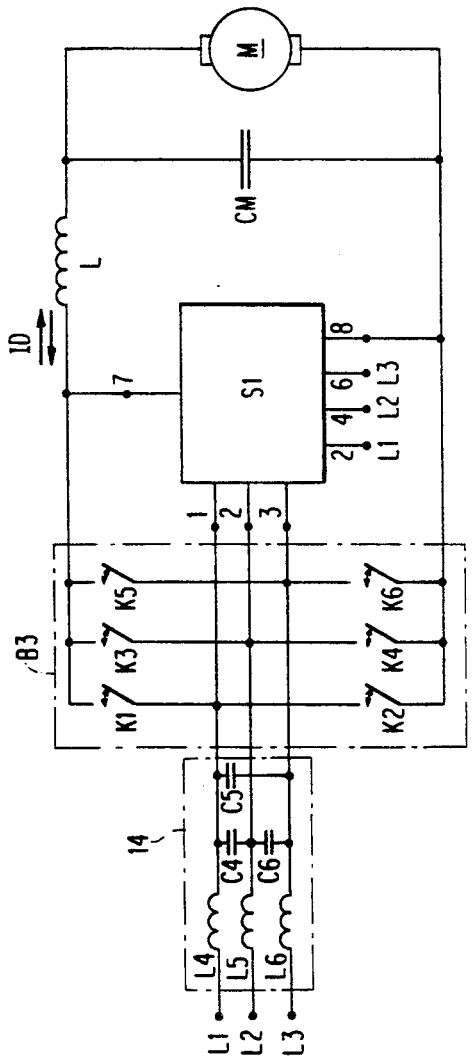
FIG. 3a is a circuit diagram of a rectifier for a d.c. motor; equipped with an overvoltage protector unit of the present invention (of FIG. 1a)
Figure 3B:
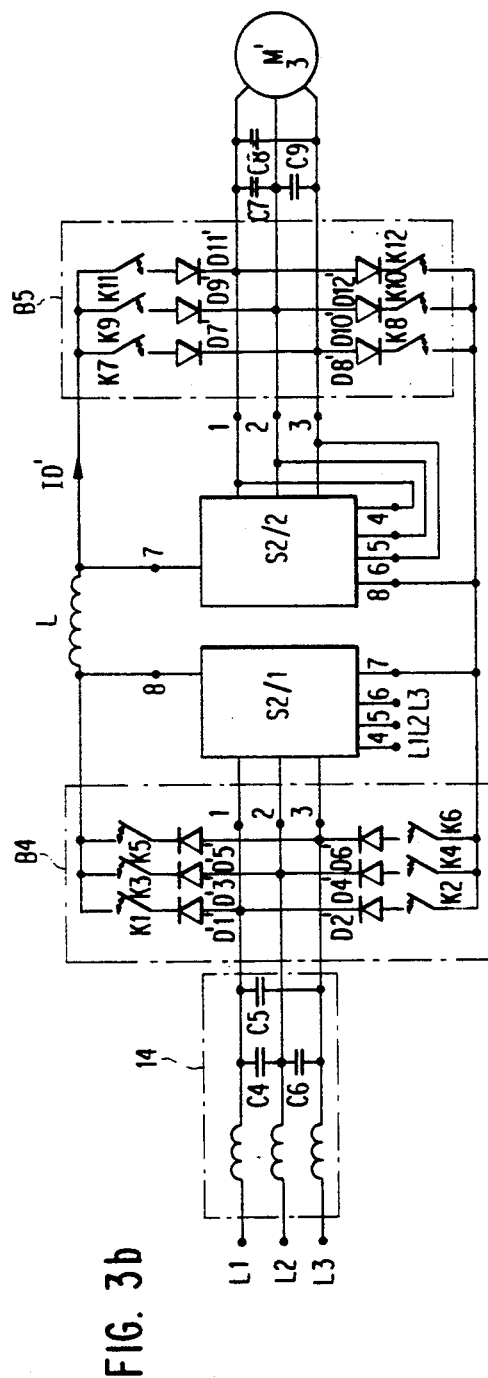
FIG. 3b is a circuit diagram of a frequency converter is an a.c. motor; equipped with two overvoltage protector units of the present invention (of FIG. 1b)
Figure 3C:
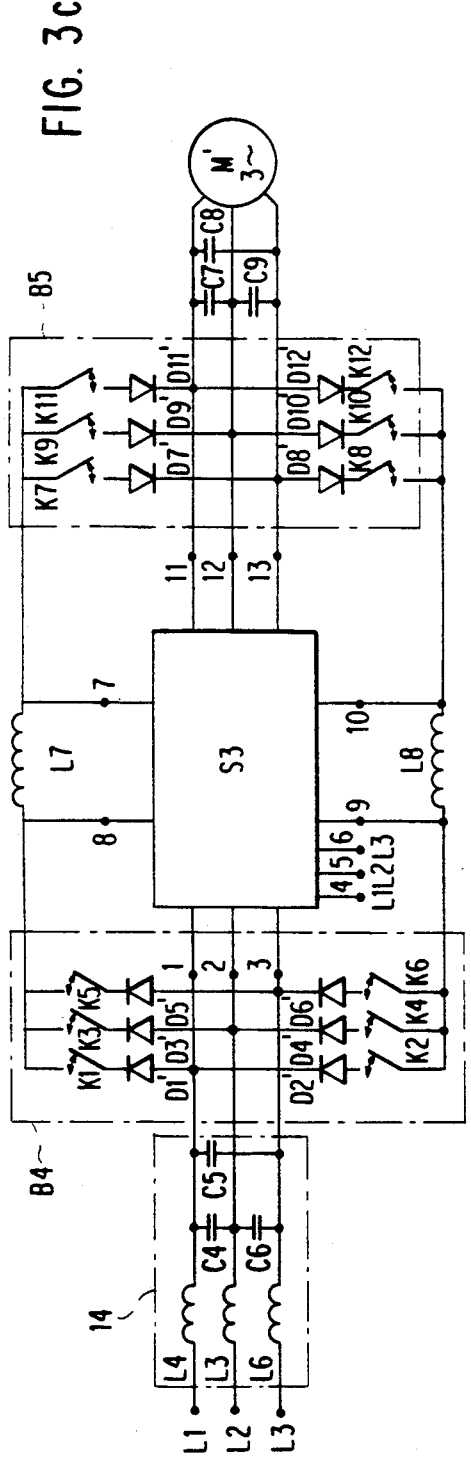
FIG. 3c is a circuit diagram of a frequency converter for an a.c. motor; equipped with an overvoltage protector unit of the present invention (of FIG. 1c)

Referring to FIG. 1a in connection with the rectifier bridge shown in FIG. 3a, the bridge feeds a d.c. motor M, which is connected in series with an inductance L and in parallel with a capacitor CM. When the mains voltage is switched on, capacitor C1 is charged to the maximum value of the voltage of the mains supply. When the voltage between two or more of the protector circuit connections 1, 2, 3, 7, 8 exceeds the capacitor voltage, current flows through capacitor C1 and the forward-connected diodes in the respective connection branches. The current will flow through the capacitor until the transistor T1 is turned on. In this manner, a path is always provided for the current when the voltage across any component of the main circuit rises above the normal level. A characteristic feature of the protector in FIG. 1a is that its action is independent of the polarity of the voltage between the protection connections. Thus it can be applied to protect bridges in which the current ID in the main circuit can flow in both directions as indicated by the arrows in FIG. 3a.

Connectors 1-3 are connected to the rectifier bridge B1, which consists of diodes D1-D6. Connector 7 is connected to the positive pole of the overvoltage unit d.c. circuit via diode D7 and to the negative pole via diode D8. Connector 8 is connected to the positive respective negative poles via diodes D9 and D10. Transistor T1 is controlled by means of a control unit C0 having the electric circuit shown in FIG. 2.

Figure 1B:
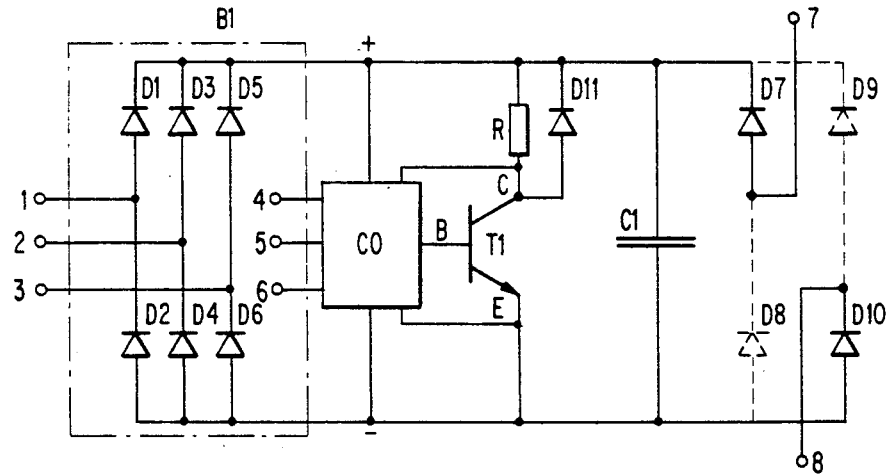
FIG. 1b is a circuit diagram of another, embodiment of the overvoltage protector.
Figure 1C:
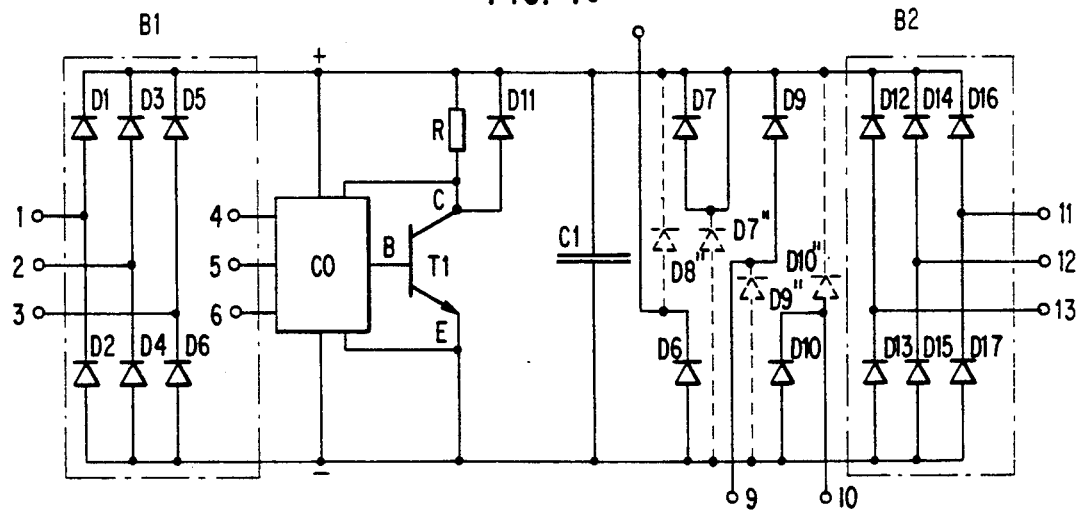
FIG. 1c is a circuit diagram of still another embodiment of the overvoltage protector.
Figure 4:
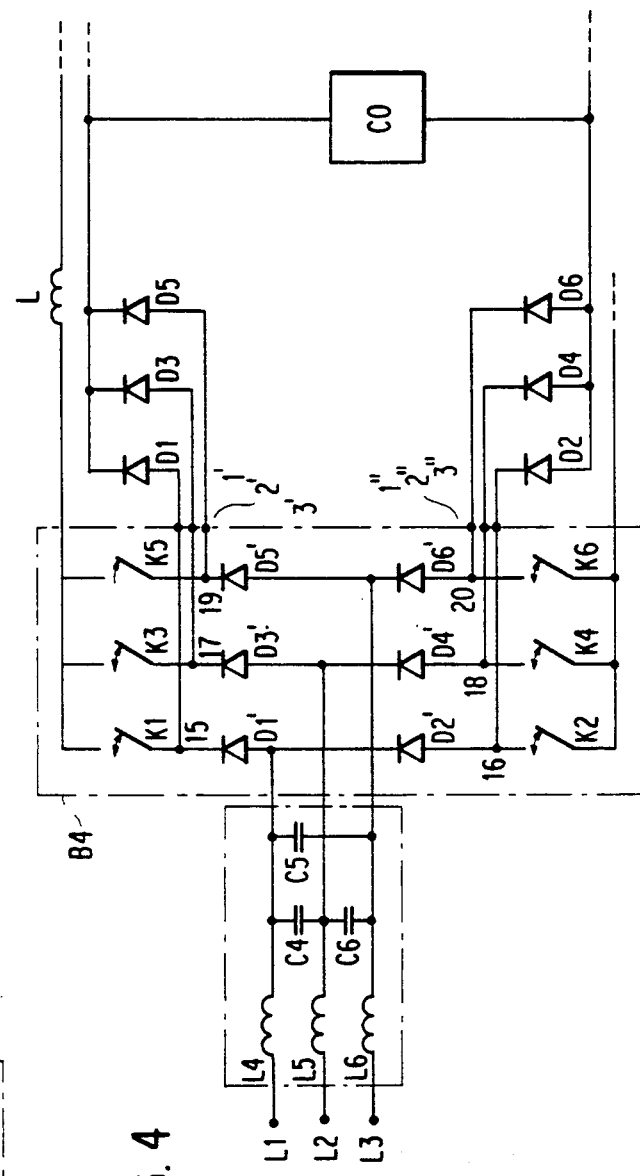
FIG. 4 illustrates how the overvoltage protector is connected to the main circuit.

In a frequency converter with an intermediate circuit with only one choke L as shown in FIG. 3b, the overvoltage protection circuit consists of two simplified protectors S2/1 and S2/2, having the electric circuit shown in FIG. 1b. In this case, the first protector S2/1, whose connectors 1-6 are connected to the mains, protects the mains bridge B4, while the second protector S2/2, whose connectors 1-6 are connected to the terminals of the a.c. motor M', protects the motor bridge B5. There are three capacitors C7-C9 connected to the motor. Moreover, both protector units will be activated in the case of malfunction, if the voltage across the filtering inductance L exceeds the permitted value of the sum of the two bridge voltages. Seen from the terminals of the filtering inductance L, the protectors are connected in series, but as seen from the protection connectors of the switching component of the bridges, there is only one protector circuit relevant to the protective action. This ensures that the protectors and the converter itself will function properly in all situations. Since the current Id' in the converter intermediate circuit flows in one direction only and the polarity of the voltage transient generated by the inductance L in case of malfunction is consequently known, it is possible to omit one (D8 and D9, indicated with broken lines in FIG. 1b) of the two diodes in the relevant protector circuit branches. Furthermore, it is to be noted that the protectors serve to protect both the switching components K1-K12 and the diodes D1'-D12' connected in series with them. If only the switching components are to be protected, the diodes D1-D6 of the protector diode bridge have to be connected to the points 15-20 between the diodes and the solid-state switches of the main circuit as shown in FIG. 4, in which case the overvoltage protector bridge consists of the main circuit diodes D1'-D6' and the protector unit's diodes D1-D6 in series.

If the filtering inductance of a converter with an intermediate circuit consists of two parts L7 and L8 (FIG. 3c) connected to the positive and negative poles, respectively, of the intermediate circuit, the overvoltage protection can be implemented using one protector circuit S3 as shown in FIG. 1c. In this case, the mains bridge B4 is protected by the diode bridge B1, which is connected to the mains bridge via connectors 1-3. Terminals 8 and 9, are connected by diodes D8 and D9 to the positive and negative poles of the protector respectively. The motor bridge B5 is protected by the diode bridge B2, consisting of diodes D12-D17 and connected to the motor bridge via connectors 11-13, and by the branches 7 and 10, which are connected by diodes D7 and D10 to the protector circuit's positive and negative poles, respectively. Since assuming that the bridges function properly the voltage across the inductance never exceeds the sum of the peak values of the main voltages applied to the bridges, the two halves of the inductance can be connected to the same protector circuit capacitor C1 via branches 7 and 8 and branches 9 and 10. If the protector circuit is to function independently of the polarity of the voltage between the connection points, then the circuit has to be provided with additional diodes D7"-D10", shown with broken lines in FIG. 1c, which are connected so that each branch of the protector circuit has a connection to both the positive and the negative pole of the circuit.

The LC circuit consisting of the inductances L4-L6 and capacitors C4-C6 of the mains filter 14 tends to start oscillating when the voltages are connected to either of the bridges B3 and B4. Capacitor C1 is charged with the maximum values of the filter capacitor voltages through diode bridge B1. The voltage of the differential amplifier M1/2 rises above the excitation limit (point 1' in FIGS. 5a-5c) of the hysteresis comparator M2/1 and the protector transistor T1 is turned on. The transistor conducts until the voltage across C1 has fallen to its minimum value, i.e. until the voltage of the differential amplifier has fallen to the cut-off value (point 2'). In this manner, the protector absorbs the oscillation energy of the filter circuit 14.

FIGS. 6a and 6b illustrate the operation of the protector unit when the mains bridge is conducting. In FIG. 6a, the voltage U" across capacitor C1 is illustrated and FIG. 6b shows the current I" through transistor T1 and power dissipating resistor R.

It is obvious to a person skilled in the art that different embodiments of the invention are not restricted to the examples discussed above, but that they may instead be varied in the scope of the following claims. For example, each branch of the diode bridge may also consist of several diodes in parallel, and several capacitors likewise be connected in parallel.

I claim:

1. An overvoltage protection device for rectifier and inverter bridges implemented with gate controlled solid state switches without zero diodes, comprising at least one overvoltage protector unit including connecting diode means, connecting a storage capacitor to an a.c. mains rectifier bridge circuit by mains protection connections, to a main d.c. circuit by d.c. protection connections and to an inverter bridge circuit by inverter protection connections,
   a control unit, measuring the voltage across said storage capacitor and generating a control signal; and
   a controllable switch driven by said control signal,
   wherein when the voltage between any of said protection connections exceeds a working voltage, measured across said storage capacitor of said protector unit, said control unit turns on said controllable switch while said control signal exceeds an excitation voltage value estimated by said control unit and allows said storage capacitor to discharge into a power dissipating resistor connected in series with said controllable switch; and turns off said controllable switch when said control signal decreases under a turn-off value.

2. A device as claimed in claim 1, wherein said connecting diode means comprises:
   a first diode bridge, connectable to the mains network or to the terminals of the solid state switches of the mains rectifier bridge circuit via said mains protection connections;
   at least a first pair of diodes connectable to the main d.c. circuit negative and positive poles via a first pair of said d.c. protection connections; and
   a second diode bridge, connectable to an a.c. load or to the terminals of the solid state switches of the inverter bridge circuit via said inverter protection connections;
   wherein when the voltage between any of said protection connections exceeds said working voltage across said storage capacitor, a discharge current flows between said any of said protection connections through such forward biased diodes of said connecting diode means which are connected to said any of said protection connections, through said storage capacitor or said controllable switch, controlled by said control unit.

3. A device as claimed in claim 2 wherein said control unit is supplied with d.c. energy through at least one resistor from said storage capacitor and through a network connected to the mains bridge or to the inverter bridge.

4. A device as claimed in claim 1, 2 or 3 protecting rectifier bridges supplying a d.c. motor including a protector unit comprising said control unit connected in parallel across said storage capacitor, detecting the overvoltage and accordingly turning on or off said controllable switch, wherein said protector unit is connected to the main d.c. network or to the terminals of the solid state switches of the mains rectifier bridge by said mains protection connections via said first diode bridge; and to the main d.c. circuit negative and positive poles by two of said d.c. protection connections via said first pair of diodes and a second pair of diodes.

5. A device as claimed in claim 1, 2 or 3 protecting rectifier and inverter bridges of a frequency converter supplying an a.c. motor and having a filtering inductance connected in the main d.c. circuit, including a first and second protector unit each comprising said control unit connected in parallel across said storage capacitor detecting the overvoltage and accordingly turning on or off said controllable switch wherein:
   said first protector unit is connected to the main rectifier bridge by said mains protection connections via said first diode bridge and to the main d.c. circuit negative and positive poles by a first pair of d.c. protection connections via said first pair of diodes, on the side of the rectifier bridge; and
   said second protector unit is connected to the inverter bridge circuit by said inverter protection connections via said first diode bridge and to the main d.c. circuit negative and positive poles by said first pair of d.c. protection connections via said first pair of diodes, on the side of the inverter bridge.

6. A device as claimed in claims 1, 2 or 3 protecting rectifier and inverter bridges of a frequency converter supplying an a.c. motor and having two filtering inductances each connected to the positive and negative poles respectively in the main d.c. circuit, including a protector unit comprising said control unit connected in parallel across said storage capacitor, detecting the overvoltage and accordingly turning on or off said controllable switch connected:
   to the mains or to the terminals of the solid state switches of the mains rectifier bridge circuit by said mains protection connections via said first diode bridge;
   to the a.c. load or to the terminals of the solid state switches of the inverter bridge circuit by said inverter protection connections via said second diode bridge;

to main d.c. circuit by said first pair of d.c. protection connections, to the terminals of said first filtering inductance via said first pair of diodes; and by a second pair of d.c. protection connections, to the terminals of said second filtering inductance via said second pair of diodes.

7. A device as claimed in claim 6 wherein said connecting diode means further comprises a third and a fourth pair of diodes connectable to the main d.c. circuit negative and positive poles via said first and second pair of said d.c. protection connections so as to enable the protector unit to function regardless of the polarity of the voltage between connection points.

8. A device as claimed in claim 1, 2 or 3 wherein the control unit used to control the controllable solid state switch comprises a diode bridge and a differential amplifier unit measuring the peak value of the mains voltage, a Zener diode limiting a reference voltage thus produced, said reference voltage varying with the mains voltage, another differential amplifier unit producing the difference between said reference voltage and a voltage measured between the terminals of the storage capacitor and a comparator unit which is activated when this difference exceeds an excitation value, turning on said controllable switch and allowing the storage capacitor to discharge into said power dissipating resistor.

9. A device as claimed in claim 8 wherein said comparator unit is provided with a hysteresis comparator, such that said excitation value is higher than a turn-off value of said hysteresis comparator.

10. A device as claimed in claim 9 wherein said excitation value is higher than the peak value of the voltage in said mains rectifier bridge or in the inverter bridge.

11. A device as claimed in claim 2 or 3 protecting the rectifier/inverter bridges with gate controlled solid state switches without zero diodes supplying an elevator driving motor.

12. An overvoltage protection device for rectifier and inverter bridges with gate controlled solid state switches without zero diodes, comprising at least one overvoltage protector unit connected to an a.c. mains rectifier bridge circuit by mains protection connections, to a main d.c. circuit by d.c. protection connections, and to an inverter bridge circuit by inverter protection connections, wherein when the voltage between at least two of said protection connections exceeds the voltage across a storage capacitor of said protector unit, a control unit turns on or off a controllable switch according to an excitation voltage value estimated by said control unit and allows said storage capacitor to discharge into a power dissipating resistor connected in series with said controllable switch said control unit including: a diode bridge and a differential amplifier unit measuring the peak value of the mains voltage; a Zener diode limiting a reference voltage thus produced; another differential amplifier unit producing the difference between said reference voltage and said voltage measured between the terminals of the storage capacitor; and a comparator unit which is activated when said difference exceeds said excitation voltage value, turning on said controllable switch to let the capacitor discharge into said power dissipating resistor.

13. An overvoltage protection device for rectifier and inverter bridges with gate controlled solid state switches without zero diodes, comprising at least one overvoltage protector unit connected to an a.c. mains rectifier bridge circuit by mains protection connections, to a main d.c. circuit by d.c. protection connections and to an inverter bridge circuit by inverter protection connections, wherein said protector unit comprises:

a) a control unit connected in parallel across a storage capacitor, detecting the overvoltage and accordingly turning on or off a controllable switch, comprising: a diode bridge and a differential amplifier unit measuring the peak value of the mains voltage; a Zener diode limiting a reference voltage thus produced; another differential amplifier unit producing the difference between a reference voltage and a voltage measured between the terminals of the storage capacitor; and a comparator unit, which is activated when said difference exceeds an excitation value thus turning on said controllable switch allowing the storage capacitor to discharge into a power dissipating resistor;

b) said controllable switch connected in series with said power dissipating resistor;

c) a first diode bridge connected to the mains network or to the terminals of the solid state switches of the mains rectifier bridge circuit via said mains protection connections;

d) at least a first pair of diodes connected to the main d.c. circuit negative and positive poles via a first pair of said d.c. protection connections; and e) a second diode bridge connected to an a.c. load or to the terminals of the solid state switches of the inverter bridge circuit via said inverter protection connections;

wherein when the voltage between at least two of said protection connections exceeds the voltage across said storage capacitor, a discharge current flows between said at least two of said protection connections through the respective forward biased diodes of said diode bridges and/or the pair of diodes connected thereto, and through said storage capacitor and said controllable switch controlled by said control unit which is turned on when said excitation voltage value is surpassed, allowing said storage capacitor to discharge into said power dissipating resistor.

14. An overvoltage protection device for rectifier and inverter bridges with gate controlled solid state switches without zero diodes, comprising at least one overvoltage protector unit connected to an a.c. mains rectifier bridge circuit by mains protection connections, to a main d.c. circuit by d.c. protection connections and to an inverter bridge circuit by inverter protection connections, wherein said protector unit comprises:

a) a control unit connected in parallel across a storage capacitor, detecting the overvoltage and accordingly turning on or off a controllable switch comprising: a diode bridge and a differential amplifier unit measuring the peak value of the mains voltage; a Zener diode limiting a reference voltage thus produced; another differential amplifier unit producing the difference between a reference voltage and a voltage measured between the terminals of the storage capacitor; and a comparator unit which is activated when said difference exceeds an excitation value, thus turning on said controllable switch allowing the storage capacitor to discharge into a power dissipating resistor, said control unit being supplied with d.c. energy through at least one resistor from said capacitor and through a network from said first or second diode bridges connected to the mains or inverter bridges;

b) said controllable switch connected in series with said power dissipating resistor;
c) a first diode bridge connected to the mains network or to the terminals of the solid state switches of the mains rectifier bridge circuit via said mains protection connections;
d) at least a first pair of diodes connected to the main d.c. circuit negative and positive poles via a first pair of said d.c. protection connections; and
e) a second diode bridge connected to an a.c. load or to the terminals of the solid state switches of the inverter bridge circuit via said inverter protection connections;

wherein when the voltage between at least two of said protection connections exceeds the voltage across said storage capacitor, a discharge current flows between said at least two of said protection connections through the respective forward biased diodes of said diode bridges and/or the pair of diodes connected thereto, and through said storage capacitor and said controllable switch controlled by said control unit which is turned on when said excitation voltage value is surpassed, allowing said storage capacitor to discharge into said power dissipating resistor.

15. A device as claimed in claim 13 or 14 wherein said comparator unit is provided with a hysteresis comparator, such that said excitation value is higher than a turn-off value of said hysteresis comparator.

16. A device as claimed in claim 13 or 14 wherein said excitation value is higher than the peak value of the voltage in said mains rectifier bridge or in the inverter bridge.

* * * * *